Patented June 16, 1953

2,642,374

UNITED STATES PATENT OFFICE 2,642,374

PROCESS OF PREPARING CRYSTALLINE ACTIVE PRINCIPLE FROM ALLIUM SPECIES

Ewald Seebeck, Basel, Switzerland, assignor to Sandoz Limited, Basel, Switzerland, a Swiss firm No Drawing. Application December 29, 1947, Serial No. 794,452. In Switzerland January 2, 1947

2 Claims. (Cl. 167—55)

Various species of allium have been repeatedly recommended and used successfully in a series of illnesses both in popular and in scientific medicine. The intense smell and the irritant action of the components on the mucous membranes have, however, interfered with a general application. Various experiments have therefore been undertaken to prepare odorless preparations from garlic. One group of methods is concerned with the adsorption and chemical combination of the garlic oil in the press juices and in the finally divided drug (British Patent No. 235,883, Austrian Patents Nos. 77,938 and 143,320). Another group of processes was concerned with an attempt to avoid the enzymatic fission of the unidentified true undegraded substances into garlic oil by heating in the dry state or by means of alcoholic vapour (German Patent No. 647,067; French Patent No. 699,352).

Rundqvist (Farmazeutiskt Notisblad, Helsingfors, 1909) was the first to attempt the isolation of an active principle from garlic but without result. Laland and Havrevold, Hoppe-Seyler's Zeitschrift fuer physiolog. Chemie 221, 180 (1933) were able to isolate from garlic a fraction having a depressing action on the blood sugar and a fraction having an action increasing the blood sugar. Lehmann (Naunyn Schmiedebergs Archiv fuer experimentelle Pathologie and Pharmakologie 147, 245 (1930)) was the first to prove experimentally the antibacterial properties of garlic and J. Cavallito and J. Bailey (Am. Soc. 66, 1950 (1944)) then, by steam distillation under diminished pressure of aqueous alcoholic garlic extract, succeeded in isolating from the distillate a water-soluble substance which was an unstable colorless oil having the composition $C_6H_{10}OS_2$. This substance shows in dilutions of 1:125,000 by the Agar Cup method (A. Fleming "The Lancet" 1942, page 1032) an antibacterial activity to staphylococci, streptococci, Bac. dysenteriae, Bac. typhi and Vibrio cholerae. Cavallito and co-workers (Am. Soc., vol. 67, page 1032 (1945)) were unable to confirm the anti-bacterial substance in fresh garlic stabilised by means of alcoholic vapour. If, however, they added a small quantity of the non-stabilised fresh drug to an aqueous suspension of the stabilised fresh garlic which was itself inactive to bacteria then there ensued a strong antibacterial action. From this they concluded that the anti-bacterial substance was split off by the action of an enzyme from a hitherto unknown undegraded substance.

The present invention relates to the isolation of a true undegraded crystalline odorless active principle containing nitrogen and sulphur from various species of allium, such as e. g. garlic (Allium sativum) and broad-leafed garlic (Allium ursinum).

According to the present invention a crystalline odorless active principle containing sulfur and nitrogen is prepared from bulbs or cloves of the allium genus by grinding the undried material in as fresh a state as possible in the frozen state, extracting the product with an alcohol of low molecular weight, distilling off the alcohol and isolating the active principle from the remaining aqueous extract.

An advantageous method of carrying out the invention is the following one:

Fresh garlic, which contains approximately 70 per cent of water, is frozen and then ground as finely as possible with the addition of solid carbon dioxide. For the extraction of the ground product, from which the active principle is to be obtained as completely as possible and accompanied as little as possible by other materials, the lower molecular alcohols, such as methyl alcohol or ethyl alcohol, are particularly suitable. If the drug is extracted with three times the quantity of alcohol, there is obtained during the extraction the desired alcohol concentration of about 80 per cent which is necessary in order to prevent the caking together of the extraction material and to suppress the activity of enzymes on the material.

The extraction can take place either in the cold or at a temperature not exceeding 40–50° C. The alcoholic extract is evaporated in a vacuum to a syrupy consistency at as low a temperature as possible. The residue can then directly be worked up further, but it is more advantageous to separate off the garlic oil and plant fats which are still present either by extraction with ether or by centrifuging. From the thus clarified aqueous garlic extract the active principle can be extracted by organic compounds of acid character which are either liquid or become liquid in contact with water, but which are not actually miscible with water. For the extraction of the active principle from the aqueous solution phenol or o-cresol which become liquid with water have been found to be particularly suitable, but valeric acid, capronic acid, etc., also come into consideration. As only organic compounds of definitely acid nature can be used for the extraction, it can be presumed that a chemical reaction takes place between the solvent and the basic groups of the active principle. The colored solutions which contain the whole of the active principle of the garlic together with some accompanying materials are introduced into an organic solvent such as ether, benzene or chloroform or are treated with such solvents whereby the phenol or the like dissolves and the active material together with still admixed other substances are separated out in the form of a dark colored solution. This is evaporated to a small volume in vacuo and is then treated with a solvent such as methyl alcohol, ethyl alcohol or acetone. From this the active principle crystallizes out after inoculation.

The crude crystals can be again recrystallized from dilute alcohol or acetone for further purification.

According to a modified process the aqueous garlic extract obtained by the previously described process is poured into alcohol whereby a portion of the accompanying material separates out. It is separated from the precipitated bright yellow syrup and the aqueous alcoholic solution, which contains the greater part of the active principle together with accompanying materials, is evaporated to dryness in vacuo. The dry finely powdered residue is digested with absolute methanol, whereby the accompanying materials which are still present, dissolve for the most part. The active principle can be separated in a pure form from the insoluble residue by crystallization from dilute acetone or alcohol.

The active principle crystallizes from dilute ethyl alcohol (2:1) in long, fine, colorless and odorless needles. These are easily soluble in water, acetic acid and phenol, sparingly soluble to insoluble in alcohol, chloroform, acetone, ether and benzene. A dilute aqueous solution gives a red color with alloxan and the ninhydrin reaction is still positive in a dilution of 1:2000. The substance dried in high vacuo melts with decomposition and foaming between 163–165° C. The aqueous solution turns the plane of polarised light to the right; $[\alpha]_D^{21} = +62.8° (c=2)$. Elementary analysis indicates the composition $C_6H_{11}O_3NS \cdot \tfrac{1}{2}H_2O$.

Calculated
  C, 38.73%; H, 6.42%; N, 7.52%; S, 17.19%
Found_C, 38.60%; H, 6.21%; N, 7.35%; S, 17.46%

An aqueous solution of the characteristic crystalline substance from garlic, when tested by the Agar Cup method, is inactive towards staphylococci in contradistinction to the substance isolated from garlic by Cavallito. If, however, the odorless solution is treated with an enzymatic solution prepared from garlic which of itself is inactive on staphylococci, there ensues an antibacterial action and gradually the typical garlic odor becomes noticeable.

The following examples without being limitative indicate how the invention may be carried out in practice:

Example 1

20 parts by weight of fresh garlic cloves are thoroughly frozen for 3 days at −40° C. It is then mixed with 20 parts by weight of solid carbon dioxide and ground as finely as possible in a strongly cooled mill. The ground material is then immediately added to 60 parts by volume of methanol with vigorous stirring and then warmed to 10° C. and maintained at this temperature for 90 minutes. The material is then pressed out and the residue again stirred with 20 parts by volume of 80 per cent methanol for 60 minutes. The united extracts are evaporated in vacuo at 55° C. to a volume of 2.5 parts by weight. The aqueous garlic extract thus obtained is centrifuged for 10 minutes. The supernatant fatty layer is rejected and the dark colored syrup is shaken for 60 minutes at room temperature with 1 part by volume of phenol which has been liquefied by means of water. The product is then separated in a separating funnel and the aqueous portion again shaken with 0.5 part by volume of phenol liquefied with water. The united phenol extracts are shaken with 0.15 part by volume of water whereby a dark cloudy solution is formed which is stirred into 4.5 parts by volume of ether, a dark syrup separating out. After 2 hours the ether-phenol solution above the syrup is separated off and the aqueous solution again extracted twice with ether. The aqueous solution is then evaporated in vacuo to 0.36 part by weight (=0.225 part by weight of dry residue and 0.135 part by weight of water). 0.380 part by volume of methanol at 50° C. is added to the aqueous solution warmed to 40° C. After inoculation, long fine needles separate from the methyl alcoholic solution on cooling. The same are filtered off by suction and give 0.048 part by weight of crude crystals which must be again recrystallized from dilute alcohol. 0.040 part by weight of long fine needles is thus obtained which melt between 163–165° C. with foaming and decomposition.

Example 2

The methanolic extract solution from 0.500 part by weight of garlic cloves is evaporated down to 0.2 part by weight, then twice extracted with ether and again evaporated in vacuo to 0.1 part by weight. This aqueous extract solution is poured into 0.6 part by volume of alcohol with vigorous stirring, whereby a portion of the accompanying material is separated out as a bright yellow syrup. The supernatant alcoholic solution is evaporated to dryness in vacuo at a temperature not exceeding 40° C. The residue thus obtained which weighs 0.016 part by weight, is bright yellow and very hygroscopic. It is finely powdered and then shaken with 0.15 part by vol. of absolute methanol for 90 minutes. It is then separated from the undissolved material and the latter washed with ice-cold methanol and ether. After drying in vacuo over concentrated sulfuric acid 0.007 part by weight of a white powder which is no longer hygroscopic is obtained. The same is dissolved in 10 times the quantity of water and treated with acetone with slight warming until it begins to become turbid. On cooling long fine needles separate out. These are filtered off and again recrystallized from dilute acetone. 0.00185 part by weight of fine needles is obtained, melting with decomposition and foaming between 163–165° C.

What I claim is:

1. A process for the isolation of the crystalline, odorless principle of the bulbs of the allium genus, comprising the steps of grinding in frozen state bulbs of the allium genus, extracting the ground material with an aqueous low molecular alcohol selected from the group consisting of methyl and ethyl alcohols at a temperature of 40–50° C., separating the alcohol from the extract by evaporation, mixing the aqueous extract thus obtained and which contains the odorless principle of the said bulbs of the allium genus with a phenol selected from the group consisting of phenol and cresol, separating the phenol from the aqueous layer by mixing it with ether and separating the ether-phenol solution, concentrating the remaining aqueous solution in vacuo, adding thereto a low molecular alcohol selected from the group consisting of methyl and ethyl alcohols, and crystallizing the odorless principle from this solution.

2. A process for the isolation of the crystalline, odorless principle of the bulbs of the allium genus, comprising the steps of grinding in frozen state bulbs of the allium genus, extracting the ground material with aqueous methyl alcohol at a temperature between 40° and 50° C., separating the alcohol from the extract by evaporation, mixing the aqueous extract thus obtained and which contains the odorless principle of the said bulbs of the allium genus with phenol, separating phenol from the aqueous layer by mixing it with ether and separating the ether-phenol solution, concentrating the remaining aqueous solution in vacuo, adding thereto methyl alcohol, and crystallizing the new odorless principle from this solution.

EWALD SEEBECK.

References Cited in the file of this patent

UNITED STATES PATENTS

| Number | Name | Date |
| --- | --- | --- |
| 2,098,110 | Schertz et al. | Nov. 2, 1937 |

OTHER REFERENCES

Cavallito et al.—Journal American Chem. Society, volume 67, page 1032 (1945).

Beilstein — "Handbuch der organischen Chemie," 4th edition, volume 3, page 139 (1921).